United States Patent [19]

Perez et al.

[11] Patent Number: 4,602,451
[45] Date of Patent: Jul. 29, 1986

[54] BAIT ACTIVATOR DEVICE

[76] Inventors: Rulu F. Perez; Julio C. Perez, both of 275 Beacon Blvd., Miami, Fla. 33135

[21] Appl. No.: 715,916

[22] Filed: Mar. 25, 1985

[51] Int. Cl.[4] .............................................. A01K 91/04
[52] U.S. Cl. .................................... 43/26.1; 43/43.13; 43/43.1
[58] Field of Search .................... 43/26.1, 26.2, 43.13, 43/43.1; 318/285, 281, 293, 54, 55

[56] References Cited

U.S. PATENT DOCUMENTS

| | | | |
|---|---|---|---|
| 1,251,810 | 1/1918 | Oehler | 43/26.1 |
| 2,281,831 | 5/1942 | Courvelle | 43/26.1 |
| 2,665,591 | 1/1954 | Casselman | 43/26.1 |
| 2,908,103 | 10/1959 | Mertz | 43/19.2 |
| 3,001,317 | 9/1961 | Boughton | 43/19.2 |
| 3,007,432 | 11/1961 | Still | 43/26.1 |
| 4,319,171 | 3/1982 | Motoori | 318/293 |
| 4,349,978 | 9/1982 | Philip | 43/19.2 |
| 4,359,674 | 11/1982 | Botou | 318/318 |
| 4,420,900 | 12/1983 | Nestor | 43/17 |
| 4,447,768 | 5/1984 | Terui | 318/293 |
| 4,514,666 | 4/1985 | Suzuki | 318/293 |
| 4,536,985 | 8/1985 | Caviness | 43/26.2 |
| 4,544,869 | 10/1985 | Pittaway | 318/293 |

Primary Examiner—Nicholas P. Godici
Assistant Examiner—Christopher L. McKee
Attorney, Agent, or Firm—Jesus Sanchelima

[57] ABSTRACT

A bait activator for fishing lines having a DC motor, batteries and programmable controlling circuitry within a water tight house. The motor shaft is attached to the line leader causing it to rotate in both directions, alternatively. The housing may be allowed to float or it may be sunk, depending on the type of fishing the user is engaged in. The shaft of the motor is insulated from the line leader it is driving to prevent damage or electric leakage. The circuitry is programmed to cause a rotational movement on the bait that imitates that of life bait.

6 Claims, 3 Drawing Figures

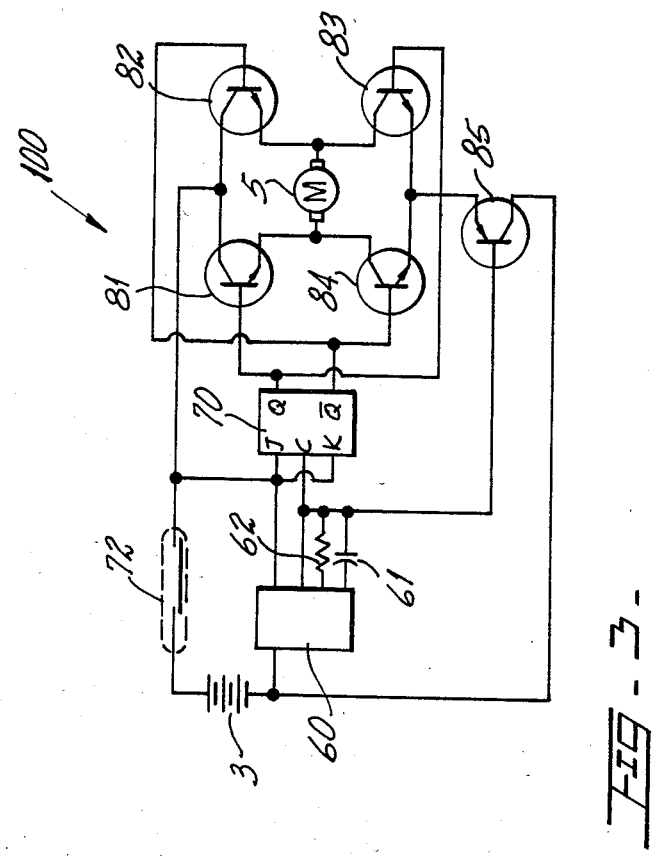
FIG-2-
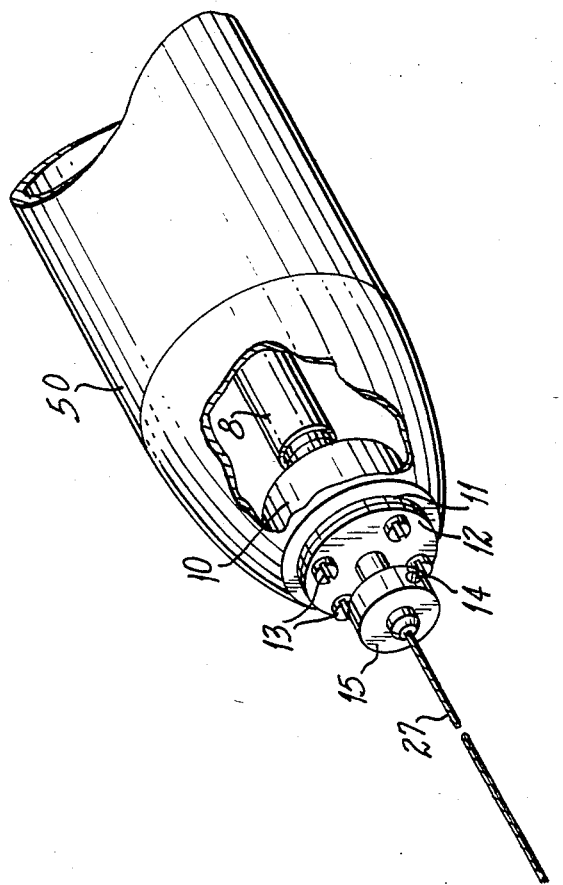
FIG-3-

BAIT ACTIVATOR DEVICE

BACKGROUND OF THE INVENTION

1. Field of the Invention

The present invention relates to fishing bait activator devices, and more particularly, to those devices that can be programmed to simulate the movements of live bait.

2. Description of the Prior Art

It is well known that a live bait gives better results than an inanimate bait. Several devices have been invented in the past that are designed to provide movement to the bait. One of these devices is disclosed in U.S. Pat. No. 4,420,900 issued to John M. Nestor on Dec. 20, 1983. Nestor's device merely raises and lowers a fishing line providing a rather unnatural jerk movement to the bait even though it states (column 1, line 40) that the movement is an irregular life-like motion. The present invention provides a programmable rotation on the line leader on both directions, with or without an interruption. The movement is transmitted from a point that is close to the bait itself and which more faithfully imitates that of a live animal. Other devices like the ones disclosed in U.S. Pat. Nos. 3,001,317; 2,908,103 and 4,349,978 provide for vibration or jiggling functions on the fishing rod.

Other patents describing the closest subject matter provide for a number of more or less complicated features that fail to solve the problem in an efficient and economical way. None of these patents suggest the novel features of the present invention.

SUMMARY OF THE INVENTION

It is the main object of the present invention to provide an activator device for a fishing bait that is connected directly to the line leader at a reasonable distance from the bait and programmable for rotation movements in both directions, with or without interruption.

It is another object of the present invention to provide an activator device that is water tight so that it can be installed directly to the end of the line and can come in contact with the water.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 shows a partially broken front portion of the present invention

FIG. 3 illustrates a diagram representation of the circuit used in the preferred embodiment

DETAILED DESCRIPTION OF THE PREFERRED EMBODIMENT

Figure 1:
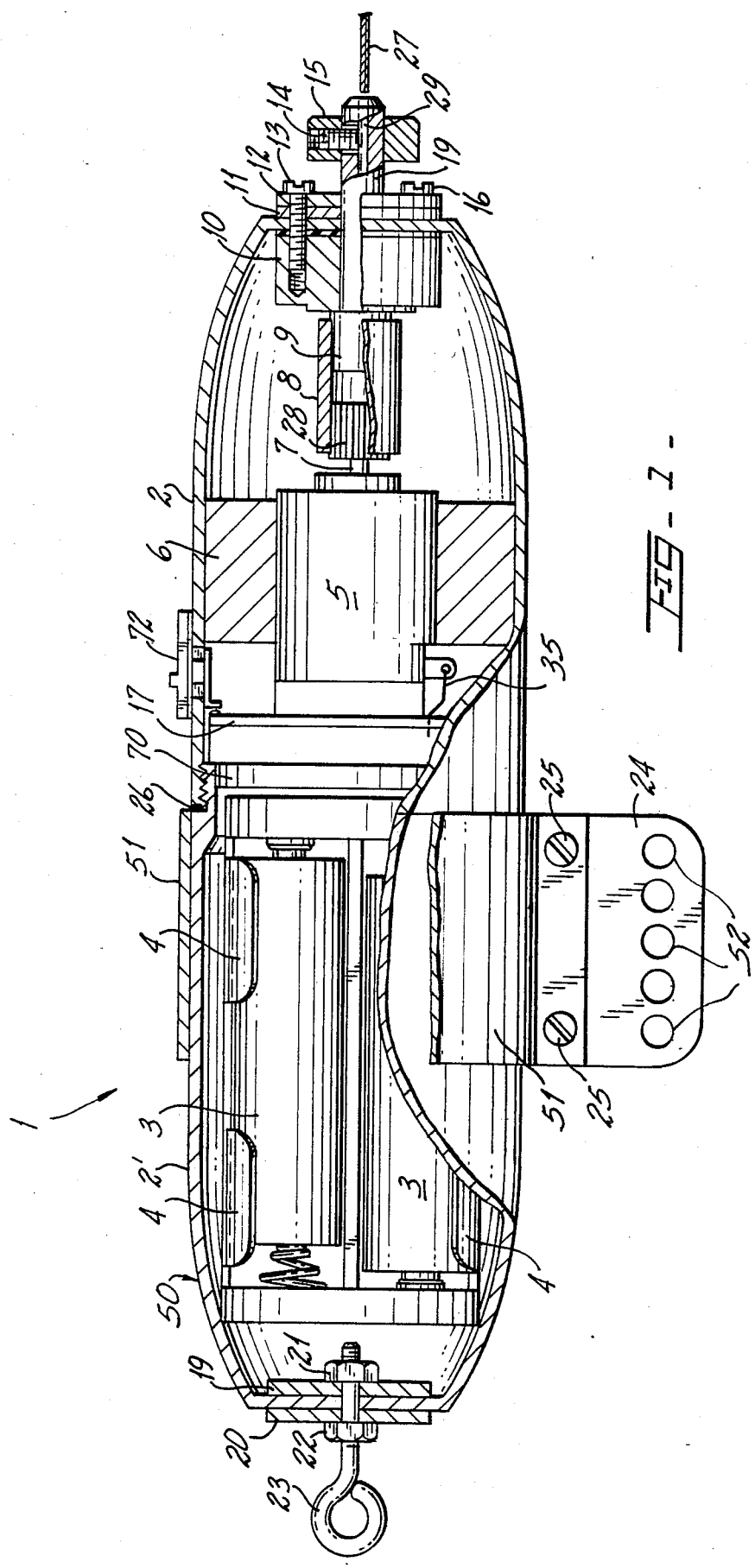
FIG. 1 represents a cross-sectional view of the present invention

Referring now to FIG. 1, where the present invention is generally referred to with numeral 1, it can be observed that it has a substantially torpedo-like shape housing 50 with eye screw 23 on one end and a belt 51 terminating in a fin member 24. Activator 1 is attached between the end of the conventional fishing line and the beginning of leader line 27 which carries the hook and bait (not shown) in a conventional manner. Belt 51 is held in place by bolts 25 with corresponding nuts (not shown) in a conventional manner. Fin 24 has several holes 52 so that a weight line may be tied to one or more of these holes if the user desires to sink activator 1.

It is possible to tie the weight line from the front holes or rear holes or the center holes thereby giving the user a choice on the inclination of housing 50. Depending on the fish that the user is after, the bait may be directed to the bottom depending on the combination of holes 52 used.

Housing 50 consists of two elongated hemisphere sections 2 and 2' that have mating threads and O-ring member 26. Inside housing 50, there is a battery pack 3 and battery pack support 4 that provides the necessary current for D.C. motor 5 and electronic circuitry 70 that controls its operation. Motor 5 is held in place, in the preferred embodiment, by foam support 6 in the shape of a ring with an outer diameter that fits snuggly within housing 50. At the rear, bracket 17 helps keep motor 5 in place. Motor shaft 7 has pinion 28 which is engaged with shaft head 9 through non-conducting sleeve 8. A non-conducting sleeve is preferred to minimize the transmission of any electric current through shaft 7 to line leader 27 which is generally conducting wire. Shaft 19 is journaled by bearing 10 which is mounted to the other end of housing 50 through sealing and base plates 11 and 12, and screws 13 and 16. Line leader 27 is attached to shaft 19 through set screws 14 and set screw assembly 15. The pressure applied to set screw 14 will determine the magnitude of the force that can be withstood before losing the attachment of line leader 27. Therefore, a larger than expected fish would take leader line 27 with it and the user would not lose device 1.

A number of circuits may be designed to provide a suitable rotational movement to line leader 27. One of such circuits is disclosed in FIG. 2, and it is generally referred to with numeral 100. This circuit 100 delivers a rotational movement in one direction, and then, after a certain time period, delivers the same movement in the opposite direction. This is desirable to avoid the possibility of entanglement of line leader 27 with seaweed or other extraneous matter if the rotational movement goes in only one direction.

Basically, circuit 100 consists of an LED flasher chip 60, such as the one commonly known as 3909 which produces a negative going pulse every 10 seconds, approximately, when a 33K resistor 62 and a 940 micro Farads capacitor 61 are used. These pulses are fed into the clock of JK flip-flop circuit 70, which is implemented with a 4027 chip, causing its outputs Q port and Q negative port change states after a whole pulse is clocked in. The J and K inputs are permanently connected to a logic high by virtue of their connection to Vcc through switch 72.

When Q is high, NPN transistor 81 and 83 are turned on, and consequently, Q negative is low and transistors 82 and 84 are off. Current through motor 5, however, will not be allowed until PNP transistor 85 conducts. Transistor 85 conducts when its base is low which is dictated by the same clock pulse inputted in JK flip-flop 70.

Then, every 10 seconds, in the preferred embodiment, motor 5 will be activated, alternating from one direction to the opposite. The duration of the activation corresponds to the width of the negative pulse.

Another approach used involves the use of a 555 timer chip which provides greater flexibility in connection with the RC time constant range. It is also possible to use a DIP switch to select more than one value for the time constant.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A bait activator device connected at the end of a fishing line, comprising:
   A. an elongate water tight housing;
   B. D.C. motor means mounted within said housing and having a leader line attached to the shaft of said motor means by means allowing adjustment of the force required to free the line from said shaft;
   C. circuitry means for controlling the activation of said motor means and allowing for alternating the direction of the rotation of said shaft;
   D. electric battery means within said housing for supplying said motor and circuitry means with suitable voltages;
   E. fin means attached to said housing including means for attaching a weight line to it so that it can sink said device and prevent rotation of the housing.

2. The device set forth in claim 1 wherein said circuitry means includes timer circuit means that cause said motor to rotate for a predetermined amount of time on each direction.

3. The device set forth in claim 2 wherein said circuitry means includes flip-flop means driving said motor means.

4. The device set forth in claim 3 wherein said flip-flop means is a JK flip-flop circuit and said circuitry means further includes two pairs of transistors and each pair connected to the outputs of said JK flip-flop circuit so that it drives said motor means in different directions according to the logic level present in said outputs.

5. The device set forth in claim 4 wherein said circuitry means includes transistor switching means for interrupting/allowing conduction of said pairs of transistors for a predetermined amount of time thereby saving electricity of said battery means.

6. The device set forth in claim 1 wherein said shaft of said motor means includes a non-conducting sleeve so that the transmission of any electric current to said leader line is prevented.

* * * * *